(12) United States Patent
Eto

(10) Patent No.: US 12,103,307 B2
(45) Date of Patent: Oct. 1, 2024

(54) LINEAR MOTION EXTENSIBLE DEVICE, MAINTENANCE DEVICE AND IMAGE FORMING APPARATUS

(71) Applicant: KYOCERA Document Solutions Inc., Osaka (JP)

(72) Inventor: Daisuke Eto, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 158 days.

(21) Appl. No.: 18/003,104

(22) PCT Filed: Jun. 21, 2021

(86) PCT No.: PCT/JP2021/023426
§ 371 (c)(1),
(2) Date: Dec. 22, 2022

(87) PCT Pub. No.: WO2021/261449
PCT Pub. Date: Dec. 30, 2021

(65) Prior Publication Data
US 2023/0249464 A1  Aug. 10, 2023

(30) Foreign Application Priority Data
Jun. 23, 2020  (JP) ................ 2020-107580

(51) Int. Cl.
*B41J 2/165* (2006.01)
*F16H 19/06* (2006.01)

(52) U.S. Cl.
CPC .............. *B41J 2/165* (2013.01); *F16H 19/06* (2013.01); *B41J 2/16502* (2024.05)

(58) Field of Classification Search
CPC .... B41J 2/165; B41J 2/16502; B41J 2/16505; B41J 2/16511; B41J 2/16538;
(Continued)

(56) References Cited

U.S. PATENT DOCUMENTS

| | | | |
|---|---|---|---|
| 2003/0090535 A1* | 5/2003 | Park | B41J 2/16547 347/29 |
| 2004/0174409 A1* | 9/2004 | Park | B41J 2/16547 347/32 |
| 2020/0164671 A1* | 5/2020 | Murashima | B41J 29/02 |

FOREIGN PATENT DOCUMENTS

JP    2014-189404 A    10/2014

* cited by examiner

*Primary Examiner* — Anh T Vo
(74) *Attorney, Agent, or Firm* — Studebaker & Brackett PC

(57) ABSTRACT

A linear motion extensible device (21) includes: rod-shaped members (31); and a rotating plate (42) rotating in a wind-up direction to wind up the rod-shaped members (30) while rotating them around a coupling rotational shaft (32) and rotating in a wind-off direction to push out the rod-shaped members (31) so as to arrange them in a line, wherein the rod-shaped member (31) has: an intermediate shaft (33) and an angle regulating part (34) which regulates widening an angle between the adjacent rod-shaped members (31), the rotating plate (42) has engagement grooves (44) engaged with the coupling rotational shaft (32) and the intermediate shaft (33), and when the rotating plate (42) is rotated in the wind-off direction, the coupling rotational shaft (32) and the intermediate shaft (33) come into contact with an inner surface (45) of the engagement groove (44), are pushed out, and leave the engagement grooves (44).

10 Claims, 12 Drawing Sheets

(58) Field of Classification Search
CPC ... B41J 2/16544; B41J 2/16585; F16H 19/02; F16H 19/06
See application file for complete search history.

LINEAR MOTION EXTENSIBLE DEVICE, MAINTENANCE DEVICE AND IMAGE FORMING APPARATUS

TECHNICAL FIELD

The present invention relates to a linear motion extensible device, a maintenance device and an image forming apparatus.

BACKGROUND

A conveyor chain is disclosed which is composed of a plurality of inner link plates pairs and a plurality of outer link plates pairs which are coupled by coupling pins, and conveys a conveyed object in a conveyance direction (patent document 1).

PRIOR ART DOCUMENTS

Patent Document

Patent Document 1: Japanese Patent Laid-Open No. 2014-189404

SUMMARY OF THE INVENTION

Problems to be Solved by Invention

In the conveyor chain, since the plurality of inner link plates and the plurality of outer link plates are coupled, a slight play at the coupling portions is piled up, and there is a fear of causing large error as a whole. For this reason, it is sometimes impossible to accurately convey the conveyed object to the specified position.

To solve the above problems, a linear motion extensible device which can improve position accuracy in the forward and rearward directions, a maintenance device, and an image forming device are provided.

Means of Solving the Problems

A linear motion extensible device according to the present invention includes: a plurality of rod-shaped members rotatably coupled via coupling rotational shafts and configured to be arranged in a line in a direction perpendicular to the coupling rotational shaft to form a support arm; and a rotating plate provided rotatably around a main rotational shaft coupled to the rod-shaped member located in a first end of the support arm via a base end pin radially outside the main rotational shaft, rotating in a wind-up direction to wind up the rod-shaped members while rotating them on the coupling rotational shaft, and rotating in a wind-off direction opposite to the wind-up direction to push out the rod-shaped members so as to arrange the rod-shaped members in a line, wherein the rod-shaped member has: an intermediate shaft provided parallel to the coupling rotational shaft; and an angle regulating part which comes into contact with the adjacent rod-shaped member in a state where the support arm is formed, and regulates widening an angle between the adjacent rod-shaped members larger than a predetermined angle from a wound state of the rod-shaped members, the rotating plate has a plurality of engagement grooves which are cut radially inward from an outer circumferential edge of the rotating blade and are engaged with the coupling rotational shaft and the intermediate shaft of the wound rod-shaped members, and when the rotating plate is rotated in the wind-off direction, the coupling rotational shaft and the intermediate shaft come into contact with an inner surface of the engagement groove, are pushed out of the engagement grooves, and leave the engagement grooves.

A maintenance device according to the present invention includes: the linear motion extensible device and a maintenance part which is moved in a direction of the line by the linear motion extensible device and prevents or repairs clogging of an ejection head which ejects liquid from an ejection nozzle.

An image forming apparatus according to the resent invention includes the maintenance device.

Effects of the Invention

According to the present invention, it becomes possible to improve position accuracy in the forward- and rearward-directions.

EMBODIMENT FOR CARRYING OUT THE INVENTION

Figure 1:
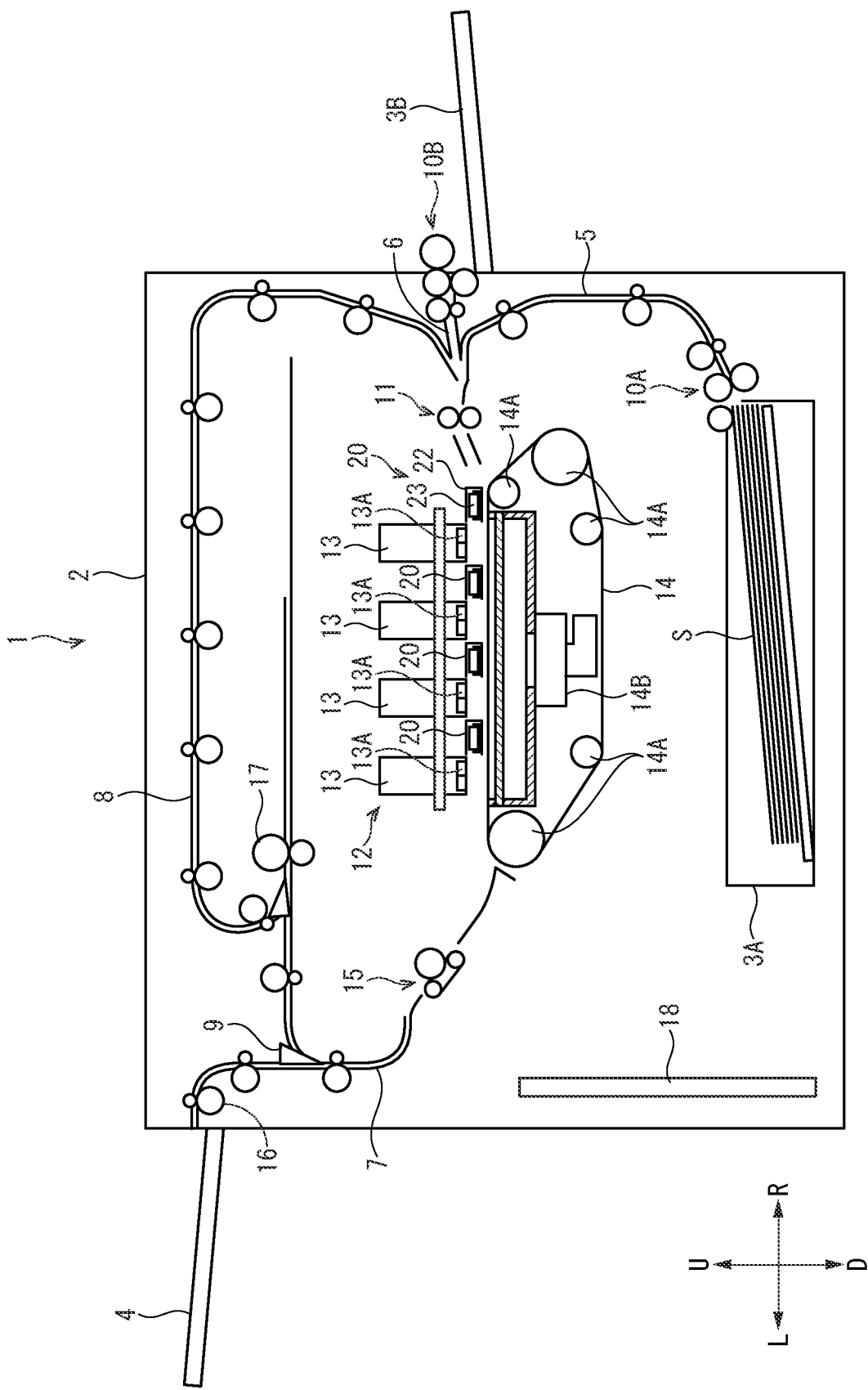
FIG. 1 is a schematic view (a front view) showing an internal structure of an image forming apparatus according to one embodiment of the present invention.

Hereinafter, with reference to the attached drawings, a preferred embodiment of the present invention will be described. Note that Fr, Rr, L, R, U and D in the drawings refer to front, rear, left, right, upper and lower. Although the directional and positional terms are used in the specification for illustrative convenience, they are not intended to limit the technical scope of the invention.

[Outline of Image Forming Apparatus]

With reference to FIG. 1, the image forming apparatus 1 will be described. FIG. 1 is a schematic view (a front view) showing the internal structure of the image forming apparatus 1.

The image forming apparatus 1 is an inkjet printer which forms an image on a sheet S by ejecting ink droplets. The image forming apparatus 1 includes a box-shaped housing 2 in which various devices are housed. A sheet feeding cassette 3A in which the sheet S is set is housed in the lower portion of the housing 2, and a manual sheet feeding tray 3B on which the sheet S is manually placed is installed on the right side surface of the housing 2. On the upper portion of the left side surface of the housing 2, a sheet discharge tray 4 on which the image-formed sheet S is stacked is installed.

In the right side portion of the inside of the housing 2, a first conveyance path 5 is formed to convey the sheet S from the sheet feeding cassette 3A toward an image forming part 12 disposed approximately in the center portion of the housing 2. A sheet feeding part 10A is provided in the upstream portion of the first conveyance path 5, and a registration roller 11 is provided in the downstream portion of the first conveyance path 5. The downstream portion of the first conveyance path 5 is connected to a sheet feeding path 6 of the manual sheet feeding tray 3B, and a sheet feeding part 10B is provided on the sheet feeding path 6. The sheet feeding part 10A has a function of taking out the sheet S from the sheet bundle in the sheet feeding cassette 3A, and the sheet feeding part 10B has a function of taking out the sheet S from the sheet bundle on the manual sheet feeding tray 3B.

The image forming part 12 includes a plurality of (for example, four) line heads 13 which eject the ink droplets. The line heads 13 are provided with a plurality of ejection heads 13A corresponding to four colors of black, cyan, magenta and yellow inks. Each ejection head 13A has a nozzle surface (not shown) with a plurality of ejection nozzles (not shown) open, and ejects the ink (liquid) from the ejection nozzles. Each ejection head 13A is connected to an ink pack (not shown) containing the ink of each color via a tube (not shown), and the ink is supplied from the ink pack to the ejection head 13A.

A conveyance belt 14 is wound around a plurality of tension rollers 14A installed below the image forming part 12. A large number of through-holes (not shown) are formed in the conveyance belt 14, and a suction part 14B is installed inside the conveyance belt 14 to generate negative pressure in the through-holes of the conveyance belt 14 at a position facing the image forming part 12. On the left side (the downstream side in the conveyance direction) of the image forming part 12, a decurl device 15 is installed which corrects the curl of the sheet S by conveying it while holding it.

In the left side portion inside the housing 2, a second conveyance path 7 is formed to convey the sheet S from the decurl device 15 toward the sheet discharge tray 4. A branch member 9 is provided in the middle of the second conveyance path 7, and a sheet discharge part 16 is provided in the downstream portion of the second conveyance path 7. The branch member 9 switches the discharge destination of the sheet S between the sheet discharge tray 4 and a third conveyance path 8 described later. The sheet discharge part 16 has a function of discharging the image-formed sheet S to the sheet discharge tray 4.

In the upper portion inside the housing 2, the third conveyance path 8 is formed to convey the sheet S from the branch member 9 in the middle of the second conveyance path 7 to the registration roller 11. In the middle of the third conveyance path 8, an inversion part 17 is provided for inverting the sheet S upside down.

The image forming apparatus 1 (inside the housing 2) is provided with a controller 18 for appropriately controlling various controlled devices. The controller 18 includes a processor or the like that executes various kinds of arithmetic processing according to programs and parameters stored in a memory. The controller 18 may be realized by a logic circuit (hardware) formed in an integrated circuit or the like instead of the processor or the like for executing a program or the like.

[Image Formation Processing]

With reference to FIG. 1, the image forming processing by the image forming apparatus 1 will be described. The controller 18 controls various controlled objects as appropriate and performs the image forming processing as follows.

The sheet feeding parts 10A and 10B feed the sheet S taken out of the sheet feeding cassette 3A or the manual sheet feeding tray 3B to the first conveyance path 5 or the sheet feeding path 6. The registration roller 11 temporarily blocks the sheet, corrects the skew of sheet S before printing (for single-sided printing), and feeds the sheet S before printing onto the conveyance belt 14 in accordance with the ejection timing of the ink droplets from the line head 13. The sheet S is attracted onto the conveyance belt 14 and conveyed downstream by the traveling conveyance belt 14. The image forming part 12 (the line head 13) ejects the ink droplets onto the sheet S on the conveyance belt 14 to form a full-color image (print). After passing under the image forming part 12, the sheet S is released from attraction to the conveyance belt 14, and sent to the decurl device 15. The decurl device 15 corrects the curl caused on the sheet S.

When the one-sided printing is performed, the branch member 9 opens the second conveyance path 7 and closes the third conveyance path 8. The sheet S printed on one side is discharged to the sheet discharge tray 4 through the second conveyance path 7.

When the double-sided printing is performed, the branch member 9 closes the second conveyance path 7 and opens the third conveyance path 8. The sheet S printed on one side enters the third conveyance path 8, is inverted upside down in the inversion part 17, and is conveyed again toward the registration roller 11. Then, an image is formed on the back side of the sheet S in the same order as in the single-sided printing described above, the curl of the double-sided printed sheet S is corrected, and then the sheet is discharged to the discharge tray 4.

[Maintenance Device]

Incidentally, the inkjet image forming apparatus 1 is provided with a plurality (for example, four) of maintenance devices 20 for performing maintenance of the ejection head 13A, for example, during stopping. The four maintenance devices 20 are provided corresponding to the four line heads 13, and each maintenance device 20 is positioned below and on the right side of the line head 13, for example.

Figure 2:
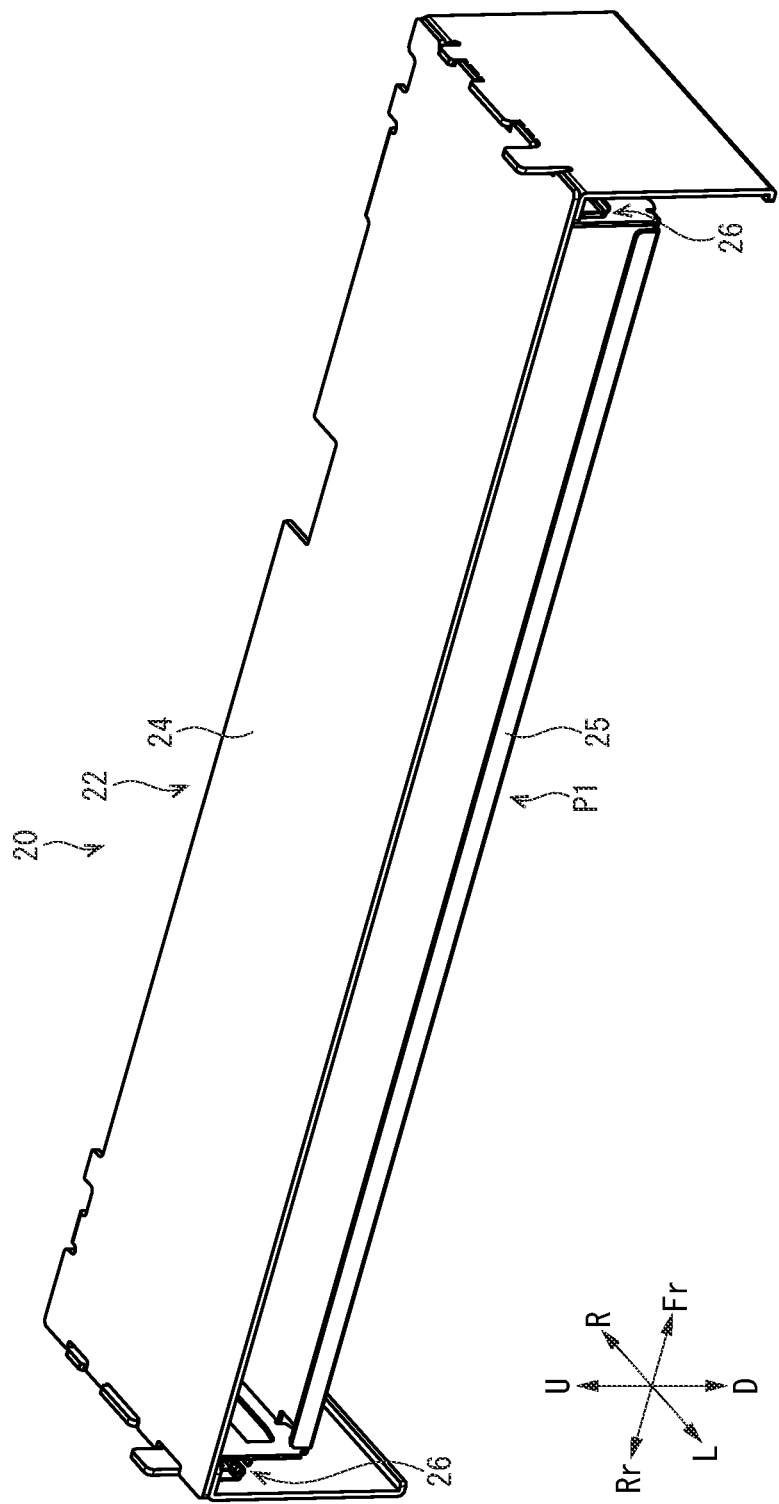
FIG. 2 is a perspective view showing a maintenance device according to the embodiment of the present invention.
Figure 3:
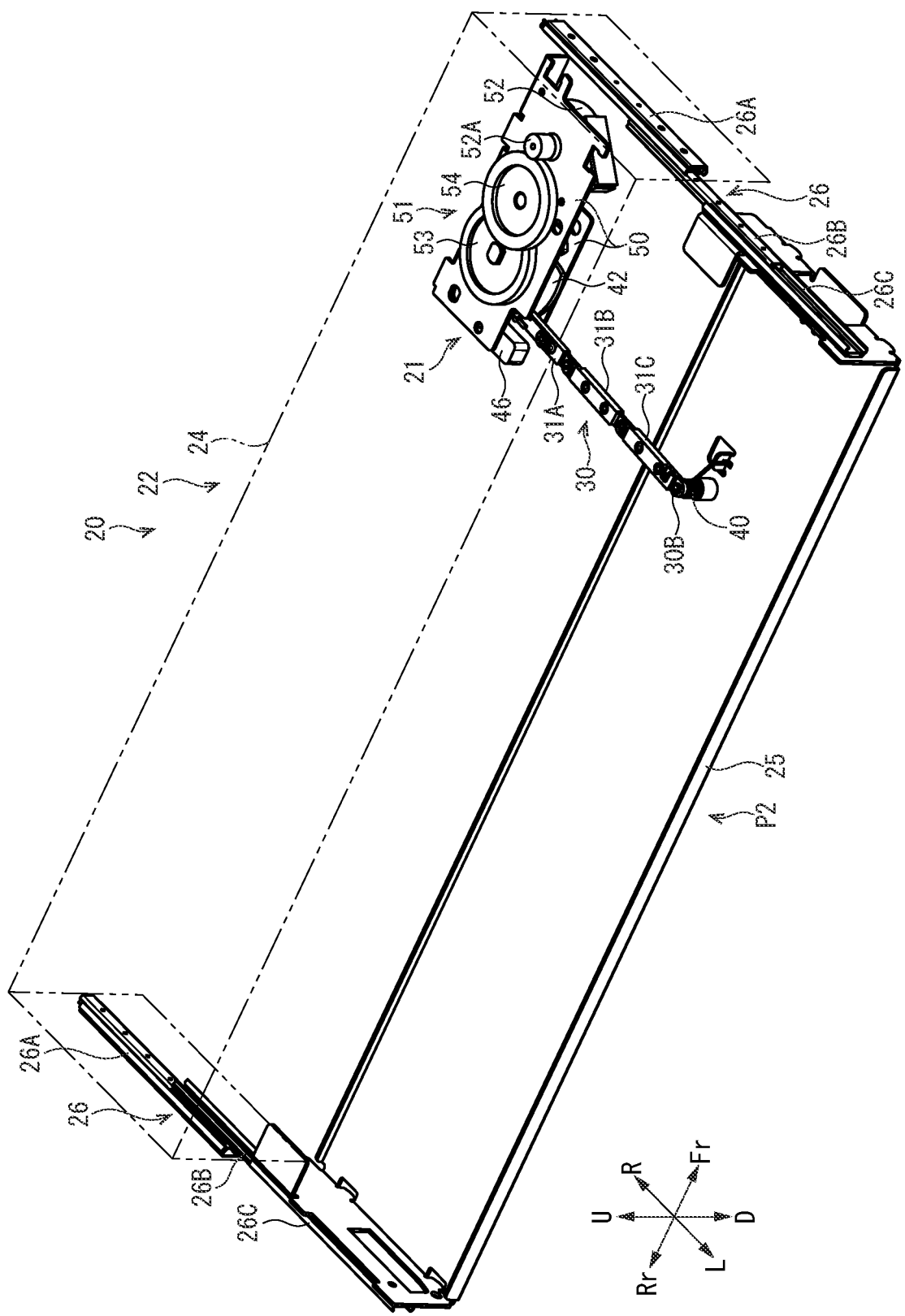
FIG. 3 is a perspective view showing the maintenance device (a push-out position) according to the embodiment of the present invention.

With reference to FIG. 1 to FIG. 3, the maintenance device 20 will be described in detail. FIG. 2 and FIG. 3 are perspective views showing the maintenance device 20.

Since the four maintenance devices 20 have almost the same structure, one maintenance device 20 will be described below.

The maintenance device 20 includes a linear motion extensible device 21 (see FIG. 3), a conveyance structure part 22, and a maintenance part 23 (see FIG. 1). The linear motion extensible device 21 has a function of moving the maintenance part 23 supported by the conveyance structure part 22 in the left-and-right direction (the forward-and-rearward direction). The maintenance part 23 has a function of preventing or repairing clogging of the ejection head 13A. The linear motion extensible device 21 and the maintenance part 23 are electrically connected to the controller 18, and controlled by the controller 18.

Hereinafter, the conveyance structure part 22 and the maintenance part 23 will be described prior to the description of the linear motion extensible device 21.

<Conveyance Structure Part>

As shown in FIG. 2 and FIG. 3, the conveyance structure part 22 has a housing 24 and a carrier 25. The housing 24 is made of sheet metal, for example, and is formed in an approximately box-like shape. The carrier 25 is made of sheet metal, for example, and is formed in an approximately tray-like shape (an approximately flat plate shape). The carrier 25 is slidably supported by the housing 24 via a pair of front and rear slide rails 26.

As shown in FIG. 3, the slide rail 26 has a first rail 26A fixed to the inner side surface of the housing 24, a second rail 26B slidably supported by the first rail 26A, and a third rail 26C slidably supported by the second rail 26B. The third rail 26C is fixed to the outer side surface of the carrier 25. The carrier 25 is disposed at a storage position P1 inside the housing 24 by drawing in the first to third rails 26A to 26C to the maximum extent (see FIG. 2). On the other hand, the carrier 25 is disposed at a push-out position P2 outside the housing 24 by drawing out the first to third rails 26A to 26C to the maximum extent (see FIG. 3).

<Maintenance Part>

As shown in FIG. 1, the maintenance part 23 is supported by the conveyance structure part 22 (on the carrier 25). The maintenance part 23 includes, for example, a cap unit and a wiping unit (neither of which is shown). The cap unit has a cap covering the nozzle surface of the ejection head 13A. The cap unit covers the nozzle surface with the cap to prevent the dried ink or the thickened ink from clogging the ejection nozzle. The wiping unit has a wiper which wipes the nozzle surface of the ejection head 13A. The wiping unit removes the ink or the like adhering to the nozzle surface with the wiper, removes the ink that is clogging the ejection nozzle, and repairs the clogging of the ejection head 13A. The cap unit may include a suction mechanism (not shown) for forcibly sucking the ink clogged in the ejection nozzle.

When the carrier 25 is moved to the push-out position P2 (see FIG. 3), the maintenance part 23 is disposed directly below each ejection head 13A constituting the line head 13. In this state, the maintenance part 23 performs the maintenance such as the prevention or the repair of clogging of each ejection head 13A. When the maintenance operation is completed and the carrier 25 is moved to the storage position P1, the maintenance part 23 is retracted from directly below the line head 13 (the ejection head 13A) and is stored inside the housing 24 together with the carrier 25 (see FIG. 1 and FIG. 2).

<Linear Motion Extensible Device>

Figure 4:
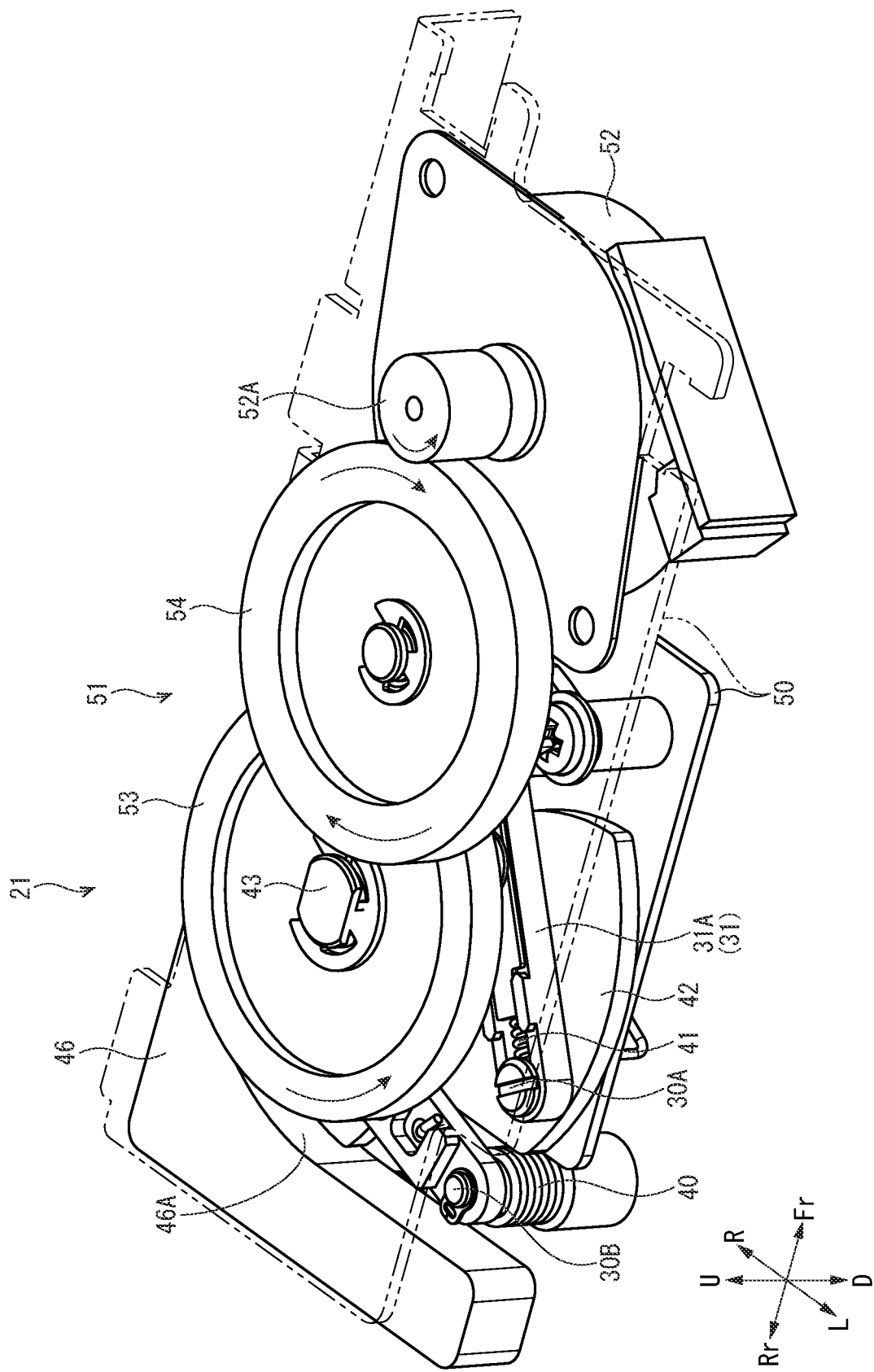
FIG. 4 is a perspective view showing a linear motion extensible device according to the embodiment of the present invention.
Figure 5:
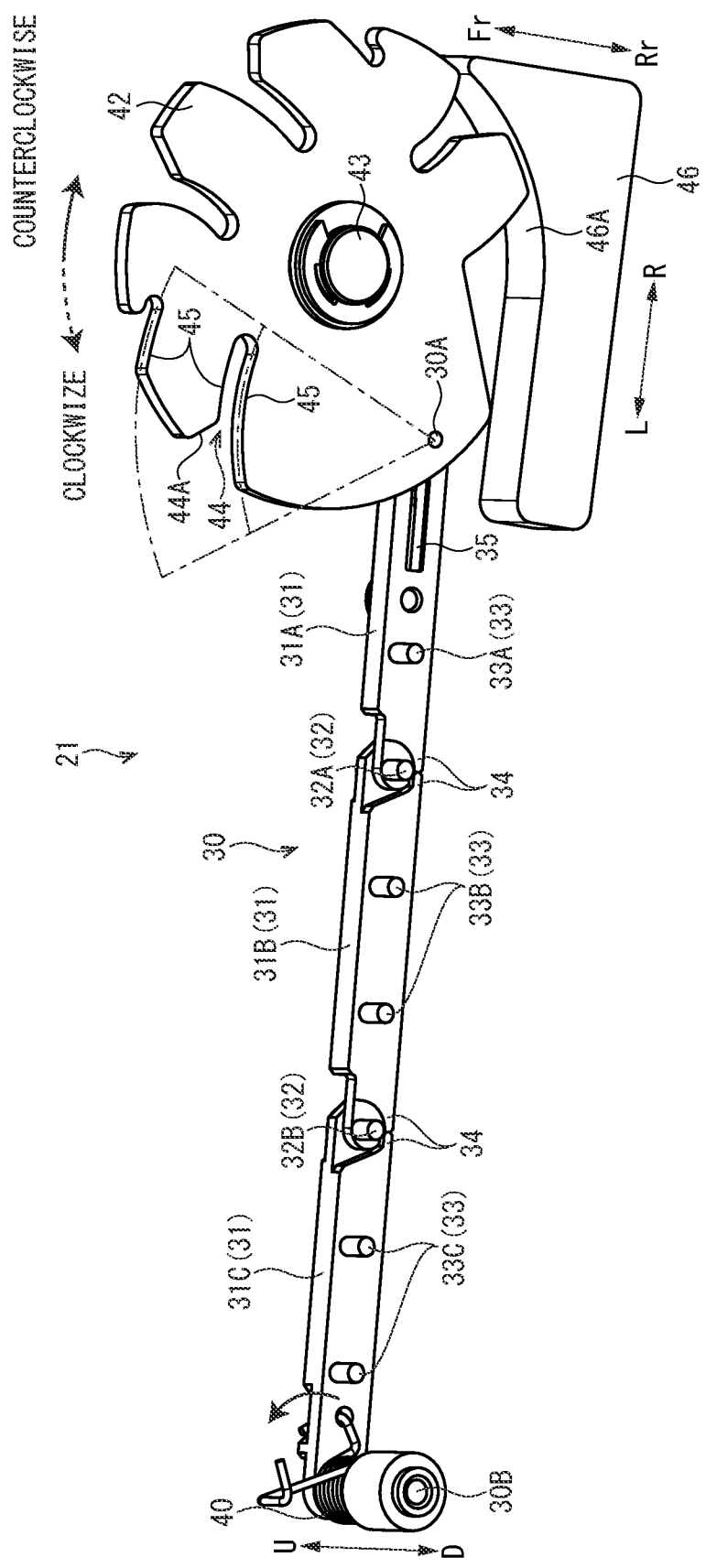
FIG. 5 is a perspective view showing the lower portion of the linear motion extensible device (in a state where a support arm is formed) according to the embodiment of the present invention.
Figure 6:
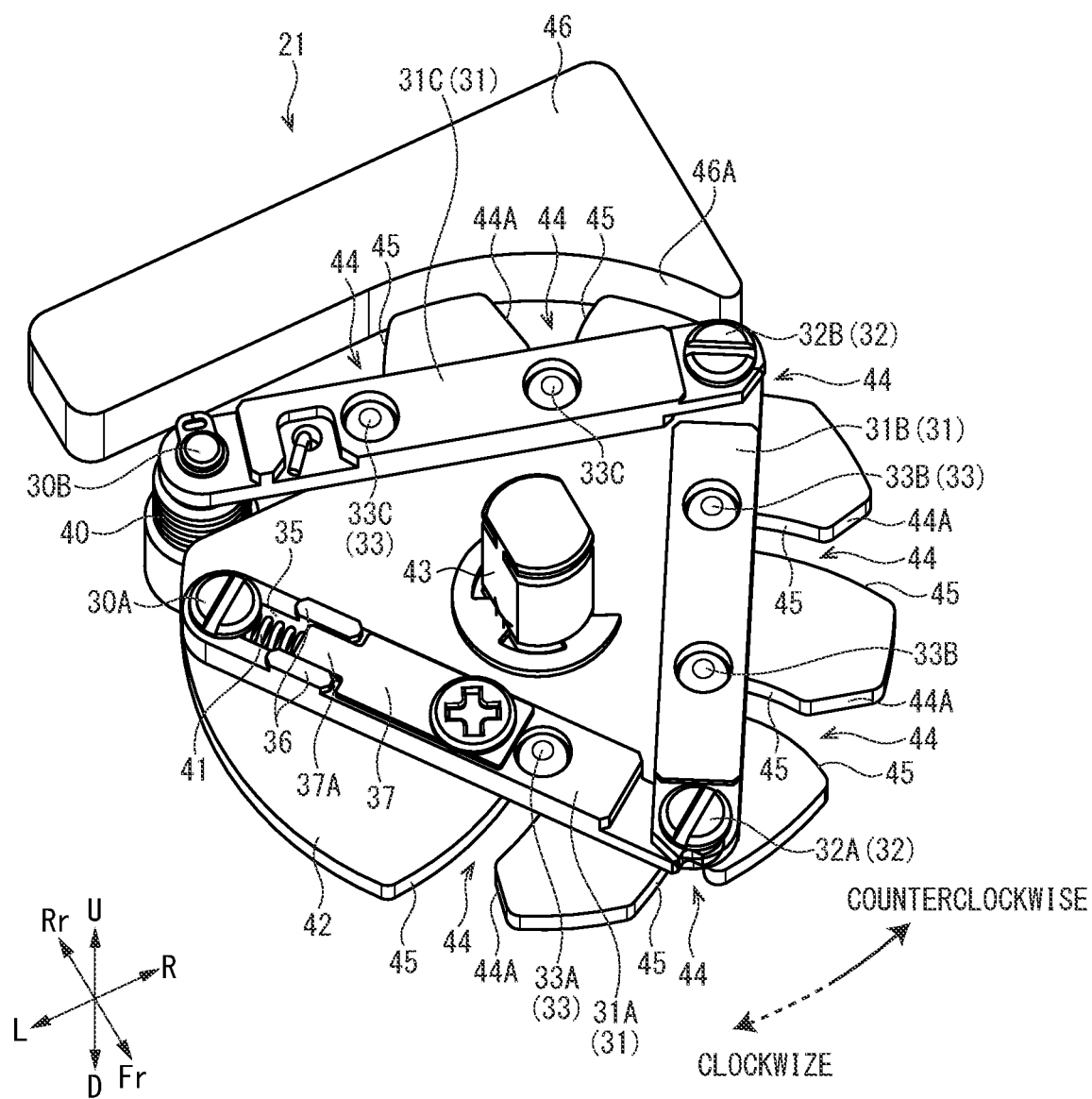
FIG. 6 is a perspective view showing the upper portion of the linear motion extensible device according to the embodiment of the present invention.
Figure 7:
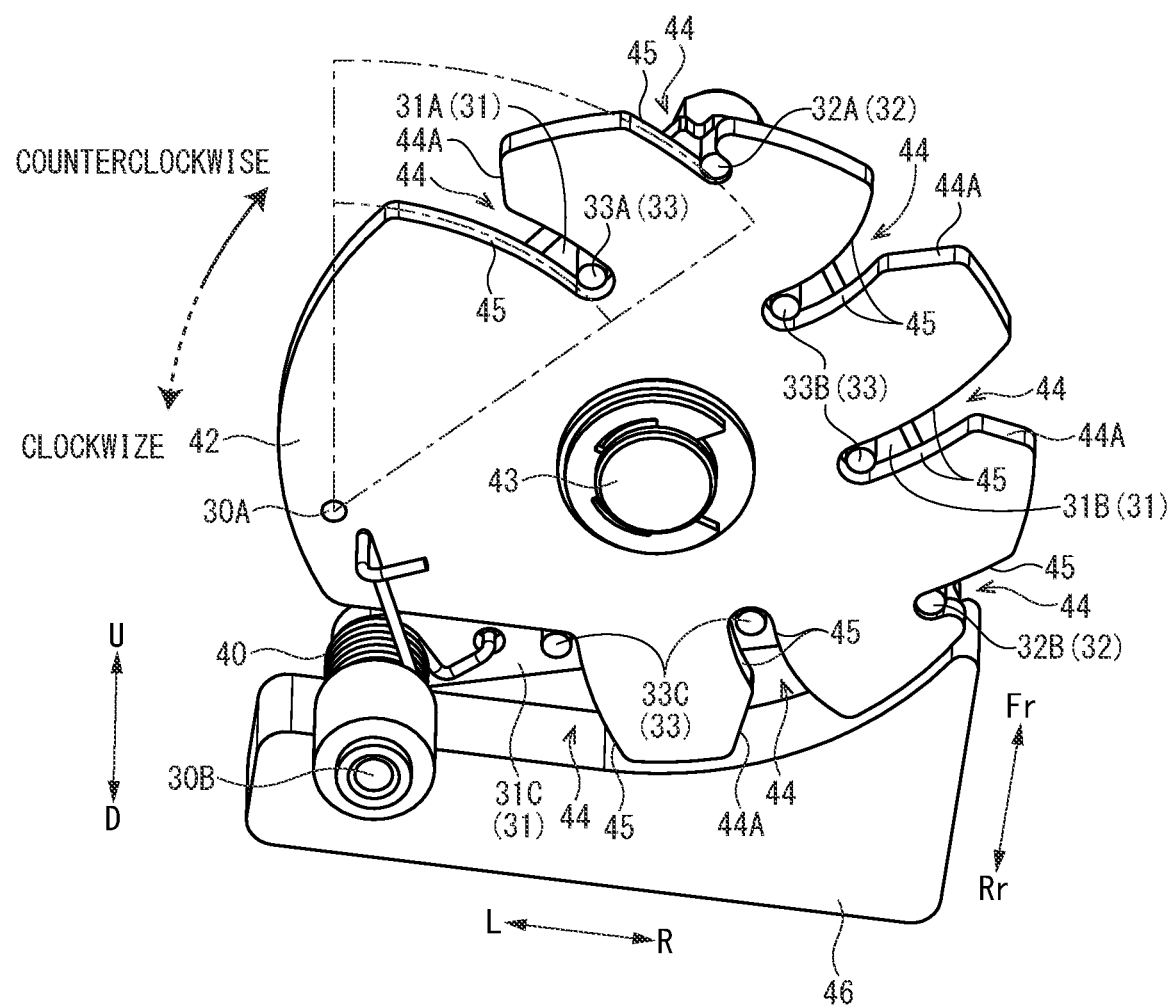
FIG. 7 is a perspective view showing the lower portion of the linear motion extensible device according to the embodiment of the present invention.

Next, with reference to FIG. 3 to FIG. 7, the linear motion extensible device 21 will be described. FIG. 4 is a perspective view showing the linear motion extensible device. FIG. 5 is a perspective view showing the lower portion of the linear motion extensible device 21 (in a state where the support arm 30 is formed). FIG. 6 is a perspective view showing the upper portion of the linear motion extensible device 21. FIG. 7 is a perspective view showing the lower portion of the linear motion extensible device 21.

As shown in FIG. 3 and FIG. 4, the linear motion extensible device 21 includes a plurality of (for example, three) rod-shaped members 31A, 31B and 31C, a biasing member 40, an elastic member 41, a rotating plate 42, a guide member 46 and a driving part 51.

(Rod-Shaped Member)

As shown in FIG. 3 and FIG. 5, the three rod-shaped members 31A, 31B and 31C are rotatably coupled via coupling rotational shafts 32A and 32B, and arranged in a line in the left-and-right direction (in the forward-and-rearward direction perpendicular to the coupling rotational shaft 32) to form a support arm 30. The base end portion of the rod-shaped member 31A, which is located on the most base end side of the support arm 30, is coupled to the rotating plate 42 via a base end pin 30A (see also FIG. 4). The tip end portion of the rod-shaped member 31C (the tip rod-shaped member), which is located on the most tip end side of the support arm 30 (the second end opposite to the first end which is one of the two ends the support arm 30 has) is coupled to the carrier 25 via a tip end pin 30B (see FIG. 3). The base end pin 30A is fixed to the rotating plate 42, and the tip end pin 30B is fixed to the carrier 25. The support arm 30 (the three rod-shaped members 31A, 31B and 31C) is formed to have a length that enables the carrier 25 to move from the storage position P1 to the push-out position P2.

In the following descriptions common to the three rod-shaped members 31A to 31C, they are simply referred to as "the rod-shaped member 31", and only numeral is attached. Similarly, in the description common to the two coupling rotational shafts 32A and 32B, they are simply referred to as "the coupling rotational shaft 32", and only numeral is attached. In this specification, the term "tip/base end" refers to the tip/base end in the forward-and-backward direction. Furthermore, the downstream direction in the forward direction is sometimes called the "push-out direction (the left direction)" and the upstream direction in the forward direction is sometimes called the "pull-back direction (the right direction)". In this specification, the term "clockwise/counterclockwise" is based on the direction of rotation when viewed from a plane.

As shown in FIG. 5 and FIG. 6, the rod-shaped member 31 is made of metal, for example, has an approximately rectangular cross section, and is formed in a rod-like shape extending in one direction. The longitudinal end portions of the rod-shaped member 31 are formed thinner than the middle portion, and the end portions of the adjacent rod-shaped members 31 overlap each other. The end portions (overlapping portions) of the adjacent rod-shaped members 31 are coupled by the coupling rotational shaft 32 penetrating in the upper-and-lower direction. The coupling rotational shaft 32 is formed in an approximately cylindrical shape, penetrates through the coupling portions of the rod-shaped members 31 in the upper-and-lower direction, and extends downward. The rod-shaped member 31 is turned (swinged) within a predetermined range around the coupling rotational shaft 32.

As shown in FIG. 5, at approximately the longitudinal center portion of the rod-shaped member 31A, one intermediate shaft 33A is provided parallel to the coupling rotational shaft 32. Similarly, the rod-shaped members 31B and 31C are provided with the two intermediate shafts 33B and 33C.

The intermediate shafts 33A, 33B and 33C are formed in an approximately cylindrical shape having approximately the same diameter as the coupling rotational shaft 32, penetrate the rod-shaped member 31 in the upper-and-lower direction, and extend downward. The four intermediate shafts 33B, 33C and the coupling rotational shafts 32A, 32B are arranged at approximately equal intervals in the longitudinal direction. In the following description common to the intermediate shafts 33A, 33B and 33C provided on the three rod-shaped members 31A to 31C, they are simply referred to as the "intermediate shaft 33" and only numeral is attached.

The rod-shaped member 31 has an angle regulating part 34 that comes into contact with the adjacent rod-shaped member 31 in a state where the support arm 30 is formed, and regulates that the angle between the adjacent rod-shaped members 31 becomes larger than a predetermined angle (rotates in the direction opposite to the rotational direction) from the wound state (see FIG. 6). The angle regulating part 34 is formed on the lower portions of both the end portions of the rod-shaped member 31. The angle regulating part 34 is formed in a hook shape to avoid the coupling rotational shaft 32 in the direction opposite to the rotational direction. The rotation of the adjacent rod-shaped members 31 around the coupling rotational shaft 32 is restricted by abutting each other's angle regulating parts 34. The angle regulating part 34 regulates the angle between the adjacent rod-shaped members 31 so as not to be widen more than the straight line. It should be noted that straight line means that the angle is substantially 180 degrees, which is sufficiently close to 180 degrees within the range of accuracy required for the linear motion extensible device 21. The substantially 180 degrees means, for example, 170 to 190 degrees, and specifically 175 to 185 degrees, more specifically 179 to 181 degrees. More precisely, the angle regulating part 34 is not formed in the rod-shaped members 31A and 31C which constitute the most tip end and the most base end of the support arm 30. In the present specification, the rotation of the rod-shaped member 31 in the direction opposite to the rotational direction in the wound state is also referred to as "reverse folding" or the like.

(Biasing Member)

As shown in FIG. 3 and FIG. 4, the biasing member 40 is provided between the rod-shaped member 31C (the tip end thereof) located at the most tip end side of the support arm 30 and the carrier 25. Specifically, the biasing member 40 is, for example, a torsion coil spring wound around the tip end pin 30B coupling the tip end portion of the rod-shaped member 31C to the carrier 25. One arm of the biasing member 40 is engaged with the rod-shaped member 31C, and the other arm of the biasing member 40 is engaged with the cut and bent portion of the carrier 25. The biasing member 40 biases the rod-shaped member 31C (the tip rod-shaped member) in the direction in which the rod-shaped member 31 is reversely folded (the opposite direction to the rotational direction in the wound state). The biasing force of the biasing member 40 is also transmitted to the other rod-shaped members 31A, 31B via the rod-shaped member 31C.

(Elastic Member)

As shown in FIG. 6, the elastic member 41 is provided between the rod-shaped member 31A located on the most base end side (the first end) of the support arm 30 and the base end pin 30A. Specifically, the elastic member 41 is, for example, a coil spring (a compression spring), and is disposed inside a long hole 35 opened on the base end side of the rod-shaped member 31A. The long hole 35 is long in the longitudinal direction of the rod-shaped member 31A (see also FIG. 5). On the upper surface of the rod-shaped member 31A, a pair of protrusions 36 is provided protruding upward along the long hole 35. On the upper surface of the rod-shaped member 31A, a presser plate 37 is fixed to block a part of the long hole 35 on the tip end side from the protrusion 36. The presser plate 37 is formed with an abutting part 37A to block between the protrusions 36.

The base end pin 30A is inserted into the long hole 35 on the base end side from the protrusions 36. The base end pin 30A moves between the protrusions 36 (the abutting parts 37A) and the base end side inner surface of the long hole 35. The base end portion of the elastic member 41 comes into contact with the base end pin 30A inserted into the long hole 35, and the tip end portion of the elastic member 41 comes into contact with the tip end side inner surface of the long hole 35. The rod-shaped member 31A (the support arm 30) is pushed out against the base end pin 30A by the biasing force of the elastic member 41, and the base end pin 30A comes into contact with the base end side inner surface of the long hole 35. When the rod-shaped member 31A (the support arm 30) is pushed in against the biasing force of the elastic member 41, the elastic member 41 is elastically deformed (shrunk) and the base end pin 30A comes into contact against the protrusions 36 and the abutting parts 37A. The elastic member 41 has a function of absorbing the deviation of the support arm 30 in the forward-and-rearward directions by its elastic deformation.

(Rotating Plate)

As shown in FIG. 5 to FIG. 7, the rotating plate 42 is made of metal, for example, and is approximately formed in a disk shape. The rotating plate 42 is arranged between upper and lower sheet metal frames 50 (see FIG. 3 and FIG. 4), and is provided rotatably around a main rotational shaft 43. The main rotational shaft 43 is provided parallel to the coupling rotational shaft 32, and the upper and lower end portions of the main rotational shaft 43 are supported by the upper and lower sheet metal frames 50 (see FIG. 4). To the rotating plate 42, the rod-shaped member 31A (located at the first end) is coupled through the base end pin 30A on the outside of the main rotational shaft 43 in the radial direction. Although the details will be described later, the rotating plate 42 is rotated in the wind-up direction (the clockwise direction) to wind up the three rod-shaped members 31, which form the support arm 30, in the pull-back direction while rotating them on the coupling rotational shaft 32 (see FIG. 6 and FIG. 7), and is rotated in the wind-off direction (the counterclockwise direction), which is opposite to the wind-up direction, to push out the three rod-shaped members 31 in the push-out direction so as to line them up (see FIG. 5).

The rotating plate 42 has a plurality of (for example, seven) engagement grooves 44 cut radially from outside to inside. The engagement groove 44 is cut in an approximately U-shape with a width slightly wider than the outer diameter of the coupling rotational shaft 32 and the like. The coupling rotational shafts 32 and the intermediate shafts 33 of the three rod-shaped members 31 in the wound state are engaged with the seven engagement grooves 44 (see FIG. 6 and FIG. 7). Radially outside the engagement grooves 44, except for the engagement grooves 44 with which the most tip end side intermediate shaft 33C and the coupling rotational shaft 32A and 32B are engaged, a corner cut portion 44A is formed by diagonally cutting the counterclockwise downstream side portion. Incidentally, the engagement groove 44 with which the most tip end side intermediate shaft 33 is engaged is largely cut out in an approximately triangular shape.

As shown in FIG. 5 and FIG. 7, the inner surface 45 of each engagement groove 44 (except for the most tip end side approximately triangular engagement groove 44) is formed in an approximately U-shape in a plan view. Each engagement groove 44 (the inner surface 45) is curved in the clockwise direction from the radially inside to the outside. Specifically, in the rod-shaped member 31, when the coupling rotational shaft 32 on the upstream side in the forward direction is set as the first coupling rotational shaft 32 and the coupling rotational shaft 32 on the downstream side in the forward direction is set as the second coupling rotational shaft 32, the inner surface 45 of each of the engagement grooves 44 with which the second coupling rotational shaft 32 and the intermediate shafts 33 of each rod-shaped member 31 are engaged is formed in an arc shape around the first coupling rotational shaft 32 of each rod-shaped member 31 or the base end pin 30A. For example, the engagement grooves 44 with which the intermediate shafts 33A of the rod-shaped member 31A are engaged and the engagement groove 44 with which the coupling rotational shaft 32A coupling the adjacent rod-shaped members 31A and 31B is engaged are cut along a concentric circle around the base end pin 30A. The engagement grooves 44 with which the intermediate shafts 33B of the rod-shaped member 31B and the coupling rotational shaft 32B are engaged is cut along a concentric circle around the coupling rotational shaft 32A. Furthermore, the engagement grooves 44 with which the intermediate shafts 33C of the rod-shaped member 31C is engaged are cut along a concentric circle around the coupling rotational shaft 32B.

As described above, the inner surface 45 of the engagement groove 44 is formed in an arc shape along the concentric circle. In each engagement groove 44, the arc-shaped inner surface 45 on the downstream side in the counterclockwise direction is formed shorter than the arc-shaped inner surface 45 on the upstream side in the counterclockwise direction. Incidentally, as described above, since the engagement groove 44 in which the most tip end side intermediate shaft 33 is engaged is cut out in an approximately triangular shape, the arc-shaped inner surface 45 is formed only on the counterclockwise upstream side portion.

(Guide Member)

As shown in FIG. 5 and FIG. 6, the guide member 46 is made of metal, for example, and is formed in a block shape with a guide surface 46A curved along the rotating plate 42. The guide member 46 is disposed on the rear side of the rotating plate 42 (the side where the rod-shaped members 31 are pushed out to form the support arm 30), faces the rotating plate 42 from the outside in the radial direction, and is fixed to a pair of upper and lower sheet metal frames 50 (see FIG. 4). The guide surface 46A of the guide member 46 faces the outer end surface of the rotating plate 42 at a predetermined interval. The guide member 46 is disposed so as to be in contact with the rod-shaped members 31 when the rod-shaped members 31 in the wound state extend radially, and has a function of regulating the falling off of the rod-shaped members 31 from the rotating plate 42. The "predetermined interval" means an interval that does not inhibit the rotation of the rotating plate 42 supporting the rod-shaped members 31, and does not cause detaching of the coupling rotational shaft 32 or the like from the engagement groove 44 even if the rod-shaped members 31 extend radially outward and come in contact with the guide surface 46A.

(Driving Part)

As shown in FIG. 4, the driving part 51 is provided to rotationally drive the rotating plate 42 around the main rotational shaft 43. The driving part 51 includes a drive motor 52, an output gear 53, and an intermediate gear 54.

The drive motor 52 is disposed in front of the rotating plate 42, and fixed on the lower surface of the upper sheet metal frame 50. The drive motor 52 is an electric motor capable of performing positioning control, such as a stepping motor. The drive motor 52 is electrically connected to the controller 18, and is driven and controlled by the controller 18. The output gear 53, which is a spur gear, is fixed to the main rotational shaft 43 on the upper surface of the upper sheet metal frame 50, and is provided on the same axis as the rotating plate 42. The intermediate gear 54 is a so-called stepped gear, and is rotatably supported by the upper sheet metal frame 50. The intermediate gear 54 is meshed with a pinion gear 52A fixed to the output shaft of the drive motor 52 and the output gear 53. The driving force (the rotating force) of the drive motor 52 rotates the output gear 53 via the intermediate gear 54, and the rotating plate 42 rotates integrally with the output gear 53.

(Operation of Linear Motion Extensible Device)

Figure 8:
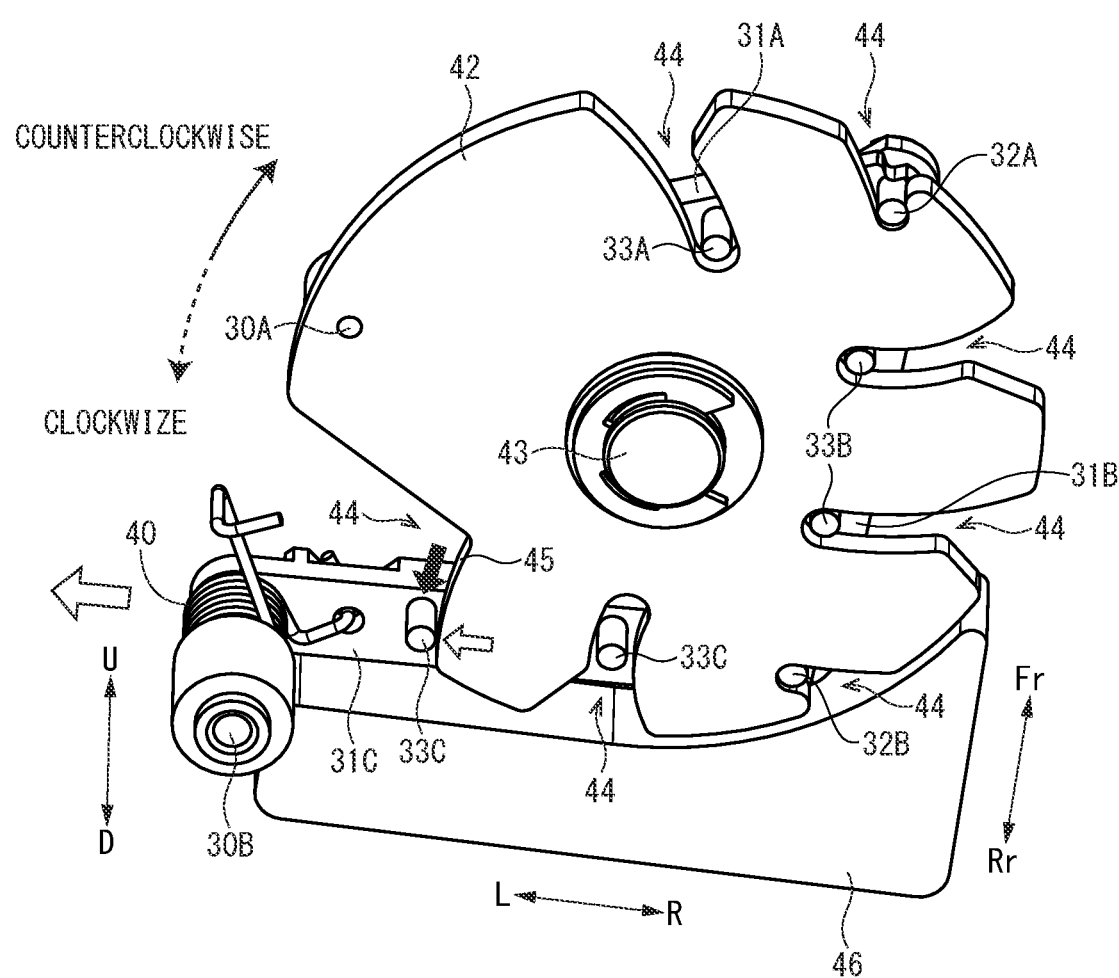
FIG. 8 is a perspective view showing a state where the most tip end side intermediate shaft is pushed out, in the linear motion extensible device according to the embodiment of the present invention.
Figure 9:
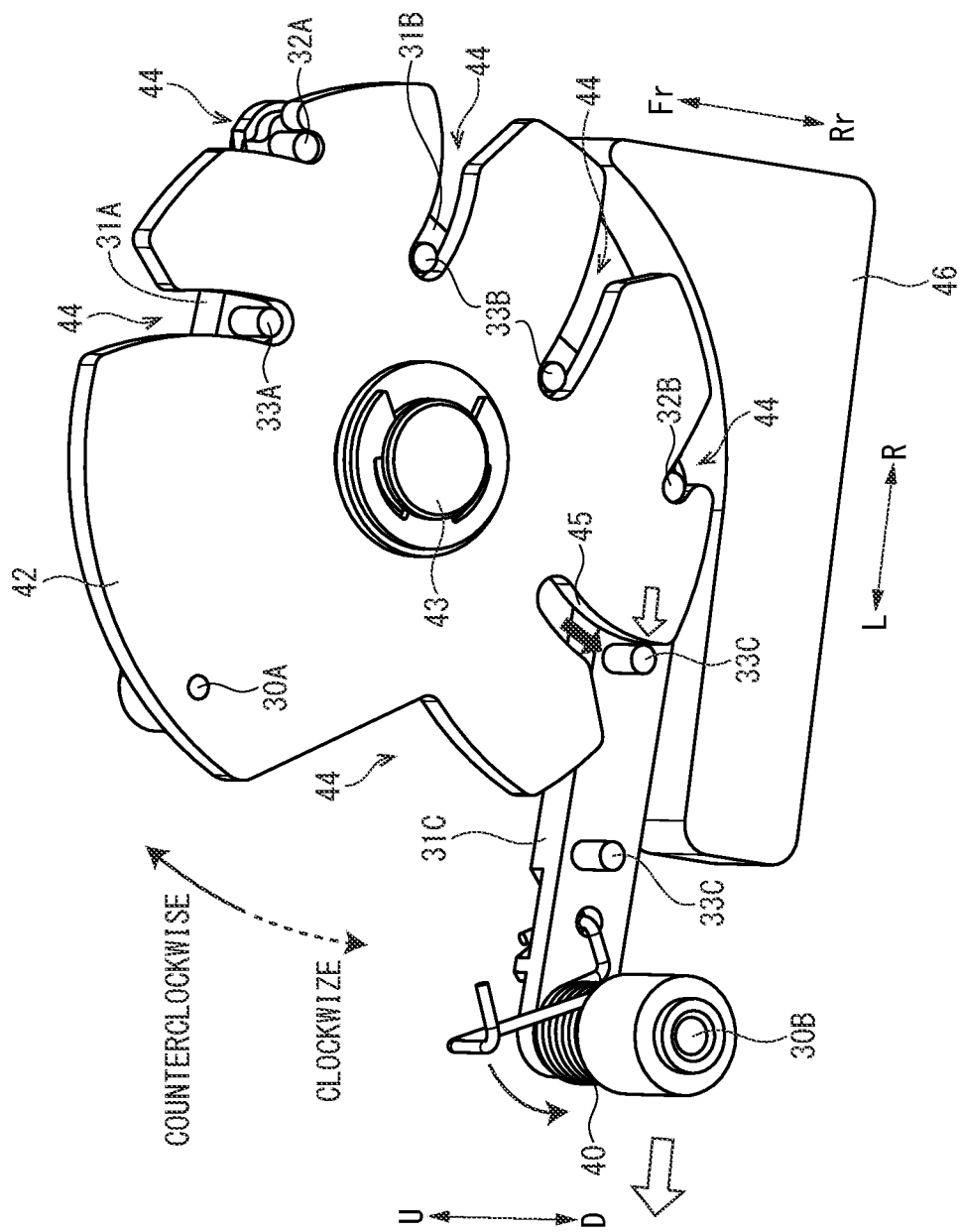
FIG. 9 is a perspective view showing a state where the second intermediate shaft is pushed out, in the linear motion extensible device according to the embodiment of the present invention.
Figure 10:
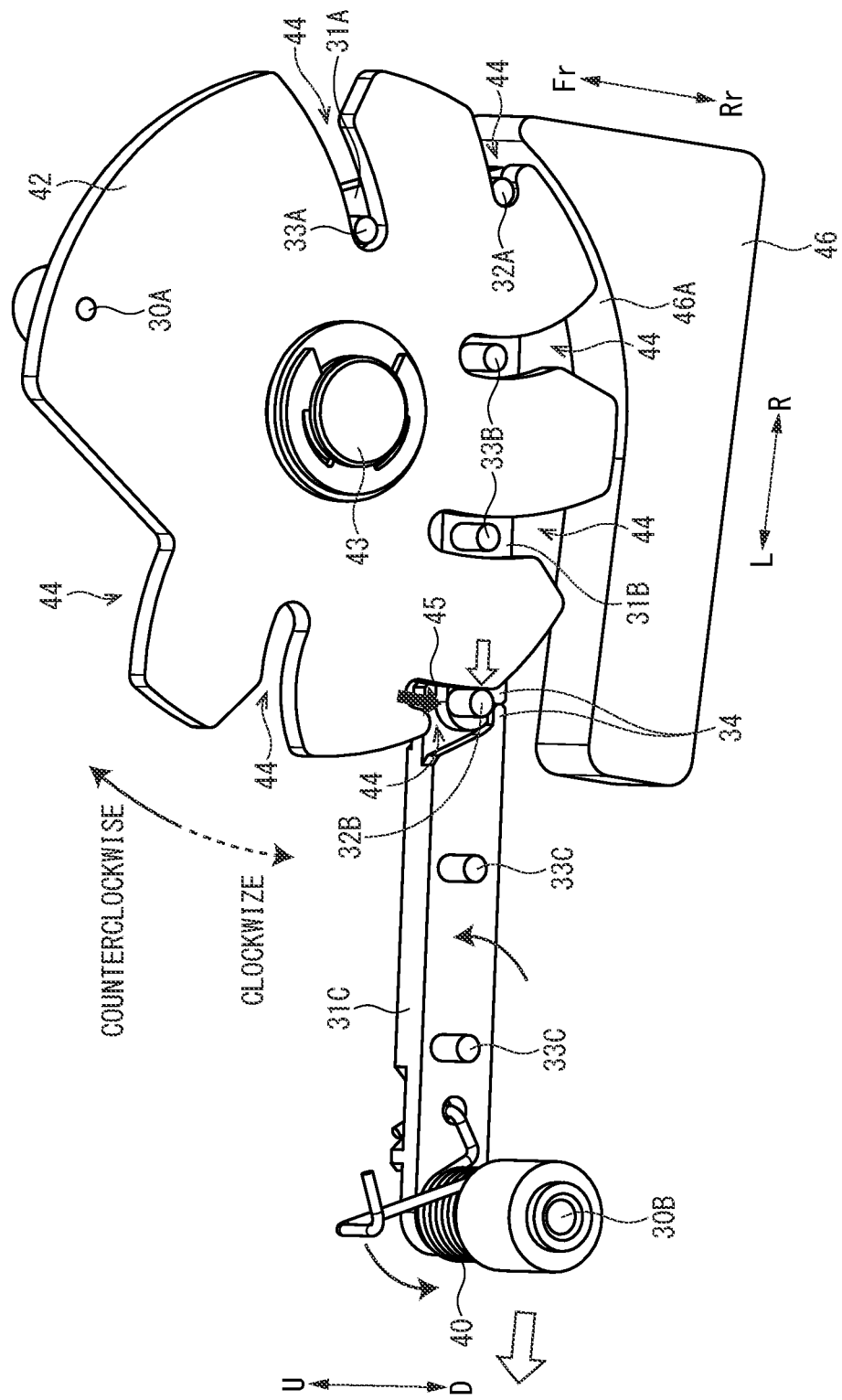
FIG. 10 is a perspective view showing a state where a coupling rotational shaft is pushed out, in the linear motion extensible device according to the embodiment of the present invention.
Figure 11:
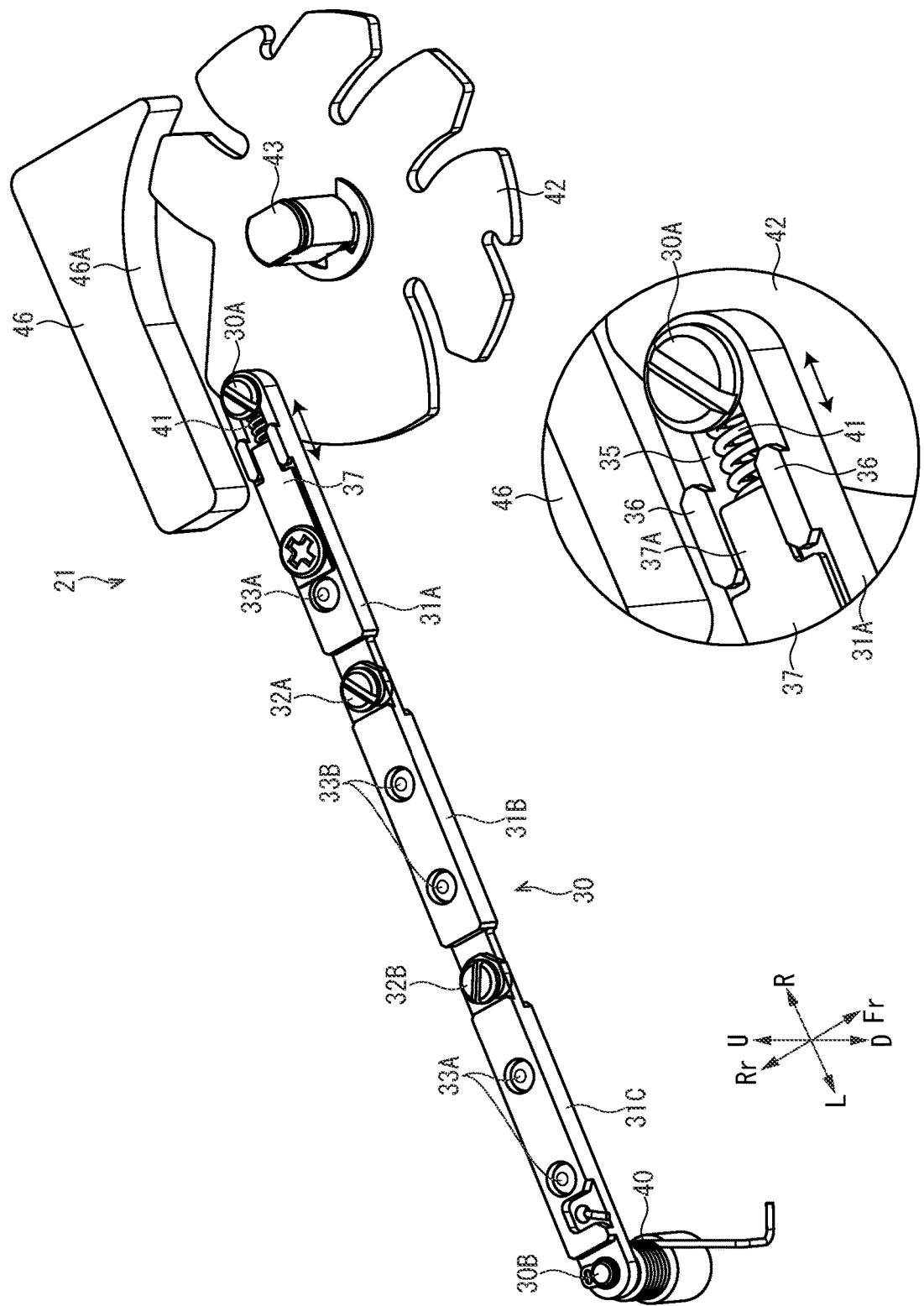
FIG. 11 is a perspective view showing a state where the support arm is formed, in the linear motion extensible device according to the embodiment of the present invention.
Figure 12:
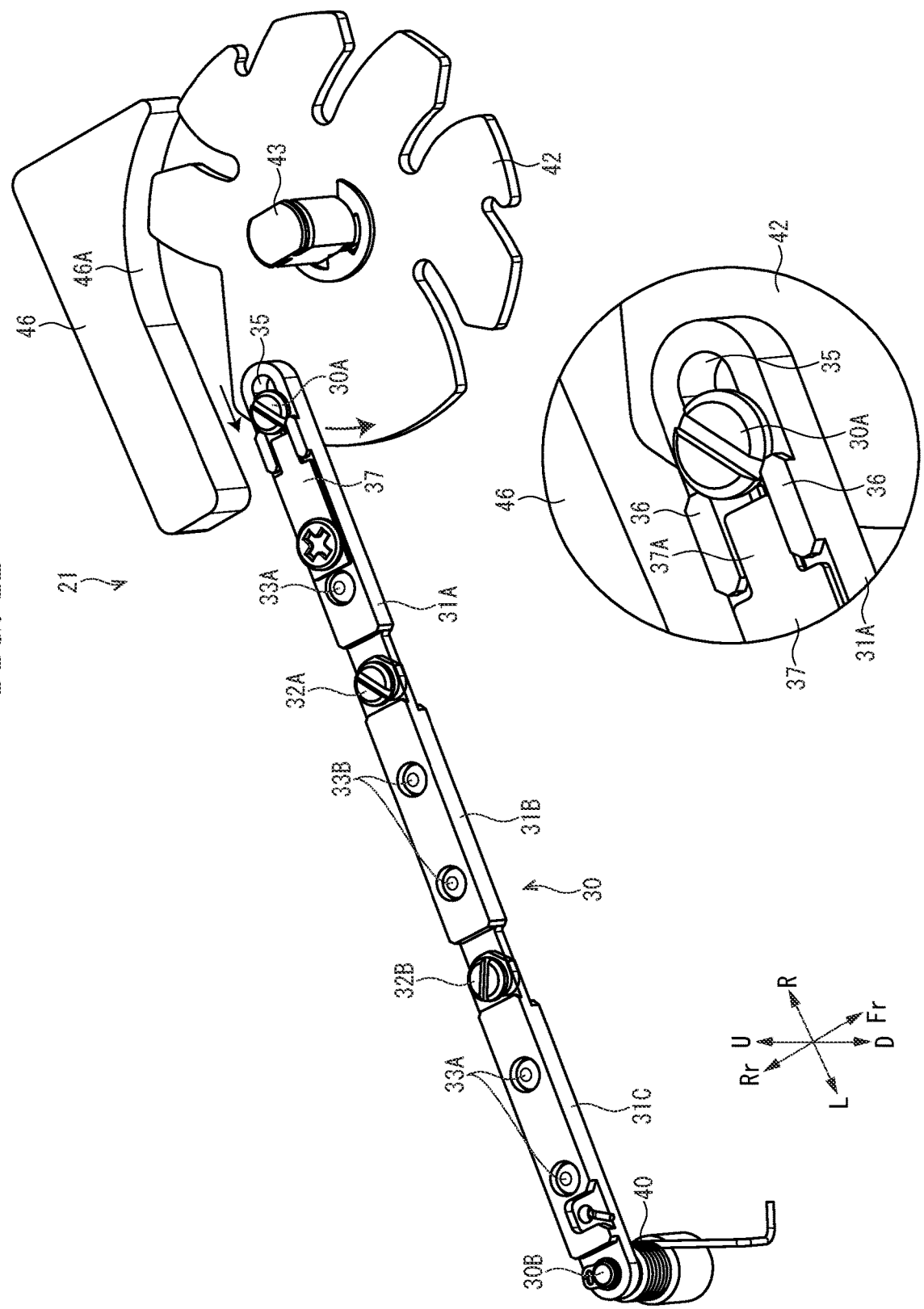
FIG. 12 is a perspective view explaining an operation of an elastic member in the state where the support arm is formed, in the linear motion extensible device according to the embodiment of the present invention.

Next, with reference to FIG. 6 to FIG. 12, the operation (action) of the linear motion extensible device 21 will be described. FIG. 8 is a perspective view showing the state where the most tip end side intermediate shaft 33C is pushed out. FIG. 9 is a perspective view showing the state where the second intermediate shaft 33C is pushed out. FIG. 10 is a perspective view showing the state where the coupling rotational shaft 32B is pushed out. FIG. 11 is a perspective view showing the formed support arm 30. FIG. 12 is a perspective view showing the action of the elastic member 41 in the state where the support arm 30 is formed. For convenience of explanation, the state in which the three rod-shaped members 31 are supported by the rotating plate 42 in the wound state and the coupling rotational shafts 32 and the intermediate shafts 33 are engaged with the engagement grooves 44 (see FIG. 6 and FIG. 7) is referred to as an initial state. In the initial state, the carrier 25 is disposed in the storage position P1 (see FIG. 2).

For example, when the output shaft (the pinion gear 52A) of the drive motor 52 controlled by the controller 18 is rotated in the counterclockwise direction, the rotational force is transmitted to the main rotational shaft 43 via the two gears 53, 54, and the rotating plate 42 is rotated in the counterclockwise direction around the main rotational shaft 43.

As shown in FIG. 8, with the counterclockwise rotation of the rotating plate 42, the intermediate shaft 33C located at the most tip end of the rod-shaped member 31C comes into contact with the upstream side inner surface 45 of the engagement groove 44 in the counterclockwise direction, and is pushed out in the push-out direction (the left direction) (see the blank arrow in FIG. 8). In addition, as the counterclockwise rotation of the rotating plate 42 progresses, the intermediate shaft 33C which is pushed out in the push-out direction moves radially outward while coming into contact with the inner surface 45 of the engagement groove 44 (see the black arrow in FIG. 8), and then leaves the engagement groove 44.

As shown in FIG. 9 and FIG. 10, when the counterclockwise rotation of the rotating plate 42 further progresses, the second intermediate shaft 33C of the rod-shaped member 31C and the coupling rotational shaft 32B move radially outward while being pushed out in the push-out direction, in turn, by the same action as described above. Thus, the rod-like member 31C is pushed out in the push-out direction from the rotating plate 42 (see FIG. 10).

As shown in FIG. 10, the pushed out rod-shaped member 31C is applied with the biasing force of the biasing member 40, and is biased in the clockwise direction around the tip end pin 30B. That is, the biasing member 40 biases the rod-shaped member 31C against the rod-shaped member 31B in such a way that the rod-shaped member 31C is folded reversely. Since the angle regulating part 34 of the rod-shaped member 31C comes into contact against the angle regulating part 34 of the rod-shaped member 31B, the reverse folding of the rod-shaped member 31C is regulated. With this, the rod-shaped member 31C is maintained in a posture aligned with the rod-shaped member 31B along the forward- and backward-directions.

Hereinafter, in the same manner as described above, as the counterclockwise rotation of the rotating plate 42 progresses, the rod-shaped member 31B (the intermediate shafts 33B, the coupling rotational shaft 32A) and the rod-shaped member 31A (the intermediate shafts 33A) are sequentially pushed out in the push-out direction. The controller 18 rotationally drives the drive motor 52 by a preset angle and then stops the drive motor 52.

As shown in FIG. 5 and FIG. 11, the rod-shaped member 31B is applied with the biasing force of the biasing member 40 through the rod-shaped member 31C, and the rod-shaped member 31A is applied with the biasing force of the biasing member 40 through the rod-shaped members 31B and 31C. Since the angle regulating part 34 of the rod-shaped member 31B comes into contact against the angle regulating part 34 of the rod-shaped member 31A, the reverse folding of the rod-shaped member 31B is regulated. With this, the three rod-shaped members 31A, 31B and 31C align in a single line in the forward-and-backward directions (the left-and-right direction) to form the support arm 30. The support arm 30 extends linearly in the push-out direction (the left direction) from the base end pin 30A fixed to the rotating plate 42.

<Action of Elastic Member>

As shown in FIG. 3, in the state where the support arm 30 is formed, the carrier 25 is arranged from the storage position P1 to the push-out position P2. At this time, the first to third rails 26A to 26C are pulled out to the maximum extent, and can no longer be pulled out. In this state, the rotating plate 42 (the drive motor 52) may rotate slightly in the counterclockwise direction, pushing the support arm 30 slightly in the push-out direction. In such a case, as shown in FIG. 12, the base end pin 30A fixed to the rotating plate 42 moves in the push-out direction along the long hole 35 (the long hole 35 closer to the base end side than the protrusions 36 (the abutting parts 37A)) while compressing the elastic member 41 (see FIG. 11). That is, the movement of the base end pin 30A is absorbed by the elastic deformation of the elastic member 41, and the support arm 30 does not move (see FIG. 11 and FIG. 12).

Thus, the support arm 30 formed by the pushed out rod-shaped members 31A, 31B and 31C pushes out the carrier 25 to the push-out position P2, and the maintenance part 23 maintains each ejection head 13A.

When the controller 18 causes the output shaft (the pinion gear 52A) of the drive motor 52 to rotate in the clockwise direction, the three rod-shaped members 31A, 31B, and 31C forming the support arm 30 are wound up on the rotating plate 42 and returned to the initial state again (see FIG. 6 and FIG. 7). At this time, the coupling rotational shaft 32 and the intermediate shafts 33 come into contact with the upstream side inner surfaces 45 of the engagement grooves 44 in the clockwise direction, and are drawn in the pull-back direction (the right direction). Since the corner cut portions 44A are formed in the engagement grooves 44, the coupling rotational shafts 32 and the intermediate shafts 33 are smoothly engaged (enter) with the engagement grooves 44 while being guided by the corner cut portions 44A.

In the above-described linear motion extensible device 21 according to the present embodiment, the three rod-like members 31 are coupled to form the support arm 30. Since the intermediate shafts 33 are provided in the longitudinal middle portion of the rod-shaped member 31, it is possible to make the rod-shaped member 31 longer in the forward-and-backward direction than, for example, the link plate constituting the conveyor chain. If the support arm 30 of a given length is composed of the link plates, a large number of link plates are required, but in a case of the rod-shaped member 31 having the intermediate shafts 33, the support arm 30 of a given length can be composed of a small number of rod-shaped members 31. This makes it possible to reduce the number of the coupling portions between the rod-shaped members 31 and to improve the positional accuracy of each rod-shaped member 31 (the tip end of the support arm 30) in the forward-and-backward directions.

In addition, when the rotating plate 42 is rotated in the counterclockwise direction, the coupling rotational shaft 32 and the intermediate shafts 33 are in contact with the inner surfaces 45 of the engagement grooves 44, are pushed out in the push-out direction (on the downstream side in the forward direction), and move outward radially as they are pushed out to leave the engagement grooves 44. With this configuration, the rod-shaped member 31 can be smoothly pushed out by rotating the rotating plate 42.

In addition, according to the linear motion extensible device 21 according to the present embodiment, since the inner surface 45 of the engagement groove 44 is formed in a predetermined arc shape, the coupling rotational shaft 32 and the intermediate shafts 33 can be pushed out and moved radially outward by the rotation of the rotating plate 42. Thus, each rod-shaped member 31 can be smoothly moved forward and rearward.

In addition, according to the linear motion extensible device 21 according to the present embodiment, when the biasing member 40 biases the rod-shaped member 31 so as to reversely fold the rod-shaped member 31, the rod-shaped members 31 can be held in a straight line. With this, the length of the support arm 30 in the forward-and-rearward directions can be kept approximately constant, and the carrier 25 (the maintenance part 23) can be placed in a predetermined position.

In addition, according to the linear motion extensible device 21, the position of the support arm 30 in the forward-and-rearward directions can be finely adjusted by elastic deformation of the elastic member 41.

In addition, according to the linear motion extensible device 21 according to the present embodiment, for example, when the rod-shaped members 31 in the wound state expand radially by the rotation of the rotating plate 42, they come into contact with the guide member 46 (the guide surface 46A), so that the falling of the rod-shaped members 31 from the rotating plate 42 can be suppressed.

In the linear motion extensible device 21 according to the present embodiment, one or two intermediate shafts 33 are provided in each rod-shaped member 31, but the present invention is not limited to this. At least one intermediate shaft 33 may be provided in the rod-shaped member 31.

In addition, in the linear motion extensible device 21 according to the present embodiment, the angle regulating parts 34 of the adjacent rod-shaped members 31 come into contact with each other by the biasing force of the biasing member 40, and the reverse folding of the three rod-shaped members 31 is regulated, but the present invention is not limited to this. For example, the linear motion extensible device 21 may be arranged so that the main rotational shaft 43 is horizontal, and the adjacent angle regulating parts 34 may come into contact with each other when the rod-shaped member 31 is rotated downward by its own weight (not shown). In this case, the biasing member 40 can be omitted.

In the linear motion extensible device 21 according to the present embodiment, the inner surface 45 of the engagement groove 44 is formed in a predetermined arc shape, but the present invention is not limited to this. For example, the inner surface 45 may be formed, for example, in a zigzag line (not shown).

In the linear motion extensible device 21 according to the present embodiment, the elastic member 41 is provided to absorb the deviation of the support arm 30 in the forward-and-rearward directions, but the present invention is not limited to this. The elastic member 41 may be omitted if the deviation in the forward-and-rearward directions of the support arm 30 may be negligibly small.

Also, in the linear motion extensible device 21 according to the present embodiment, the biasing member 40 is a torsion coil spring and the elastic member 41 is a coil spring, but an elastic body such as rubber, for example, may be used instead of these springs (not shown).

The image forming apparatus 1 according to the present embodiment is a color printer, but it is not limited to this, and may be a monochrome printer, a copying machine, a facsimile machine, and the others. The image forming apparatus 1 is an inkjet printer, but this is not limited to this. The image forming apparatus 1 may be an electrophotographic image forming apparatus (a printers, a copying machine, a facsimile machine or the like).

The description of the above embodiment shows one aspect of the linear motion extensible device, the maintenance device and the image forming apparatus according to the present invention, and the technical scope of the present invention is not limited to the above embodiments. The invention may be variously modified, replaced, or modified to the extent that it does not deviate from the purport of the technical idea, and the scope of the patent claims includes all of the implementations that may be included within the technical idea.

The invention claimed is:

1. A linear motion extensible device comprising:
   a plurality of rod-shaped members rotatably coupled via coupling rotational shafts and configured to be arranged in a line in a direction perpendicular to the coupling rotational shaft to form a support arm; and
   a rotating plate provided rotatably around a main rotational shaft coupled to the rod-shaped member located in a first end of the support arm via a base end pin radially outside the main rotational shaft, rotating in a wind-up direction to wind up the rod-shaped members while rotating them on the coupling rotational shaft, and rotating in a wind-off direction opposite to the wind-up direction to push out the rod-shaped members so as to arrange the rod-shaped members in a line, wherein
   the rod-shaped member has:
   an intermediate shaft provided parallel to the coupling rotational shaft; and
   an angle regulating part which comes into contact with the adjacent rod-shaped member in a state where the support arm is formed, and regulates widening an angle between the adjacent rod-shaped members larger than a predetermined angle from a wound state of the rod-shaped members,
   the rotating plate has a plurality of engagement grooves which are cut radially inward from an outer circumferential edge of the rotating blade and are engaged with the coupling rotational shaft and the intermediate shaft of the wound rod-shaped members, and
   when the rotating plate is rotated in the wind-off direction, the coupling rotational shaft and the intermediate shaft come into contact with an inner surface of the engagement groove, are pushed out of the engagement grooves, and leave the engagement grooves.

2. The liner motion extensible device according to claim 1, wherein
   when the coupling rotational shaft closer to the first end is set as a first coupling rotational shaft and the connecting rotation shaft adjacent to the first coupling rotational shaft is set as a second coupling rotational shaft, the inner surface of each of the engagement grooves with which the second coupling rotational shaft and the intermediate shaft of each of the rod-shaped members are engaged is formed in an arc shape around the first coupling rotational shaft or the base end pin of each of the rod-shaped members.

3. The linear motion extensible device according to claim 1, further comprising a biasing member, wherein
   when the rod-shaped member located at a second end opposite to the first end of the support arm is set as a tip end rod-shaped member, the biasing member is provided between the tip end rod-shaped member and a carrier to which the tip end rod-shaped member is coupled via a tip end pin, and biases the tip end rod-shaped member in a direction opposite to a rotational direction in the wound state.

4. The linear motion extensible device according to claim 1, further comprising an elastic member which is provided between the rod-shaped member located at the first end of the support arm and the base end pin and is elastically deformed to absorb deviation of the support arm in a direction along the line.

5. The linear motion extensible device according to claim 1, further comprising a guide member facing the rotating plate from an outside in a radial direction and arranged so as to be capable of being in contact with the wound rod-shaped members.

6. The linear motion extensible device according to claim 1, wherein
   the angle regulating part regulates the angle between the adjacent rod-shaped members so as not to widen more a straight line.

7. The linear motion extensible device according to claim 1, wherein
   the rod-shaped member located at the first end has one intermediate shaft, and the rod-shaped members other than the rod-shaped member located at the first end have two intermediate shafts.

8. The linear motion extensible device according to claim 2, wherein
   the inner surface has an upstream side inner surface and a downstream side inner surface in the wind-off direction, and the downstream side inner surface is shorter than the upstream side inner surface.

9. A maintenance device comprising:
   the linear motion extensible device according to claim 1; and a maintenance part which is moved in a direction of the line by the linear motion extensible device and prevents or repairs clogging of an ejection head which ejects liquid from an ejection nozzle.

10. An image forming apparatus comprising the maintenance device according to claim 9.

\* \* \* \* \*